UNITED STATES PATENT OFFICE.

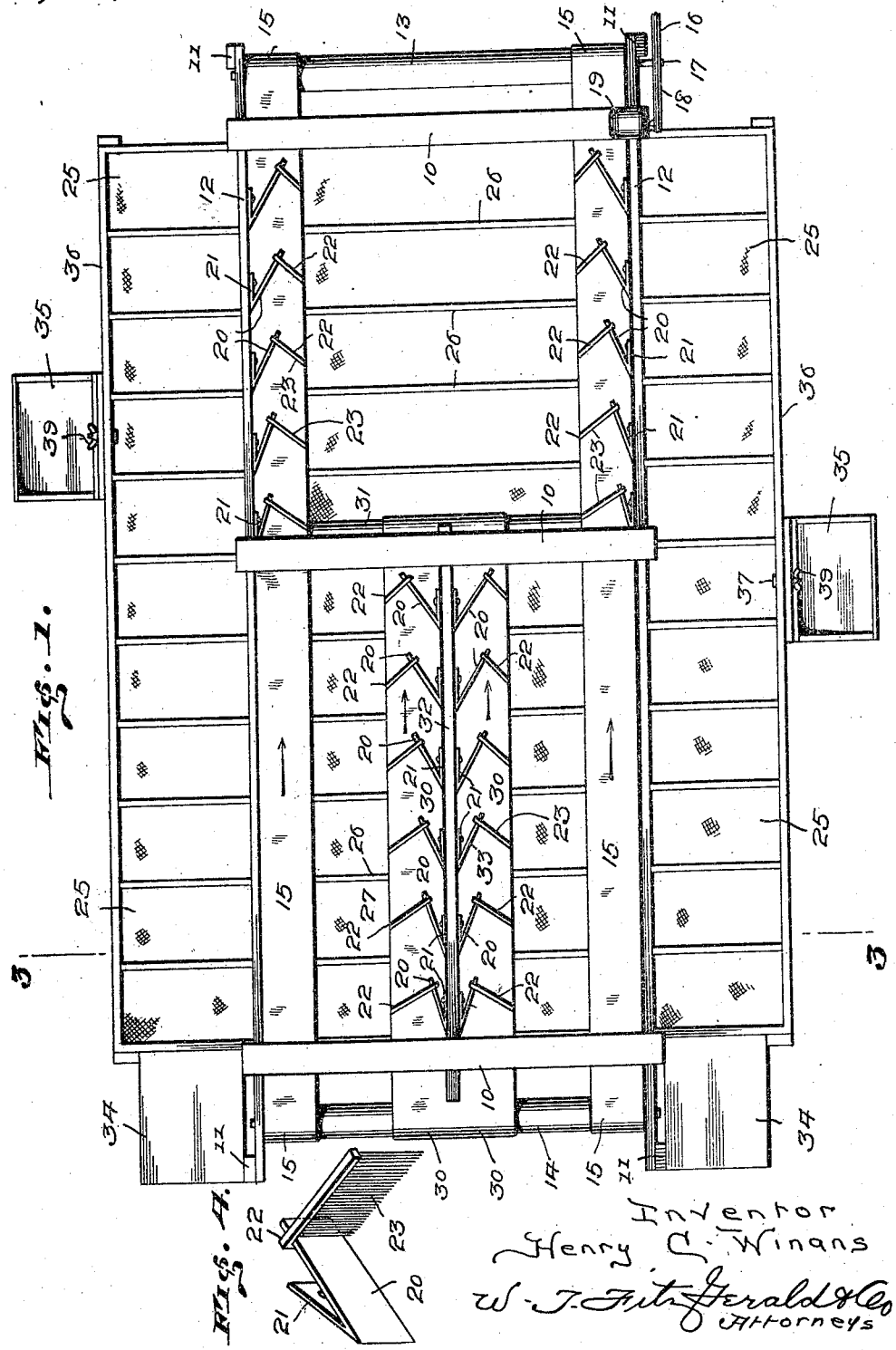

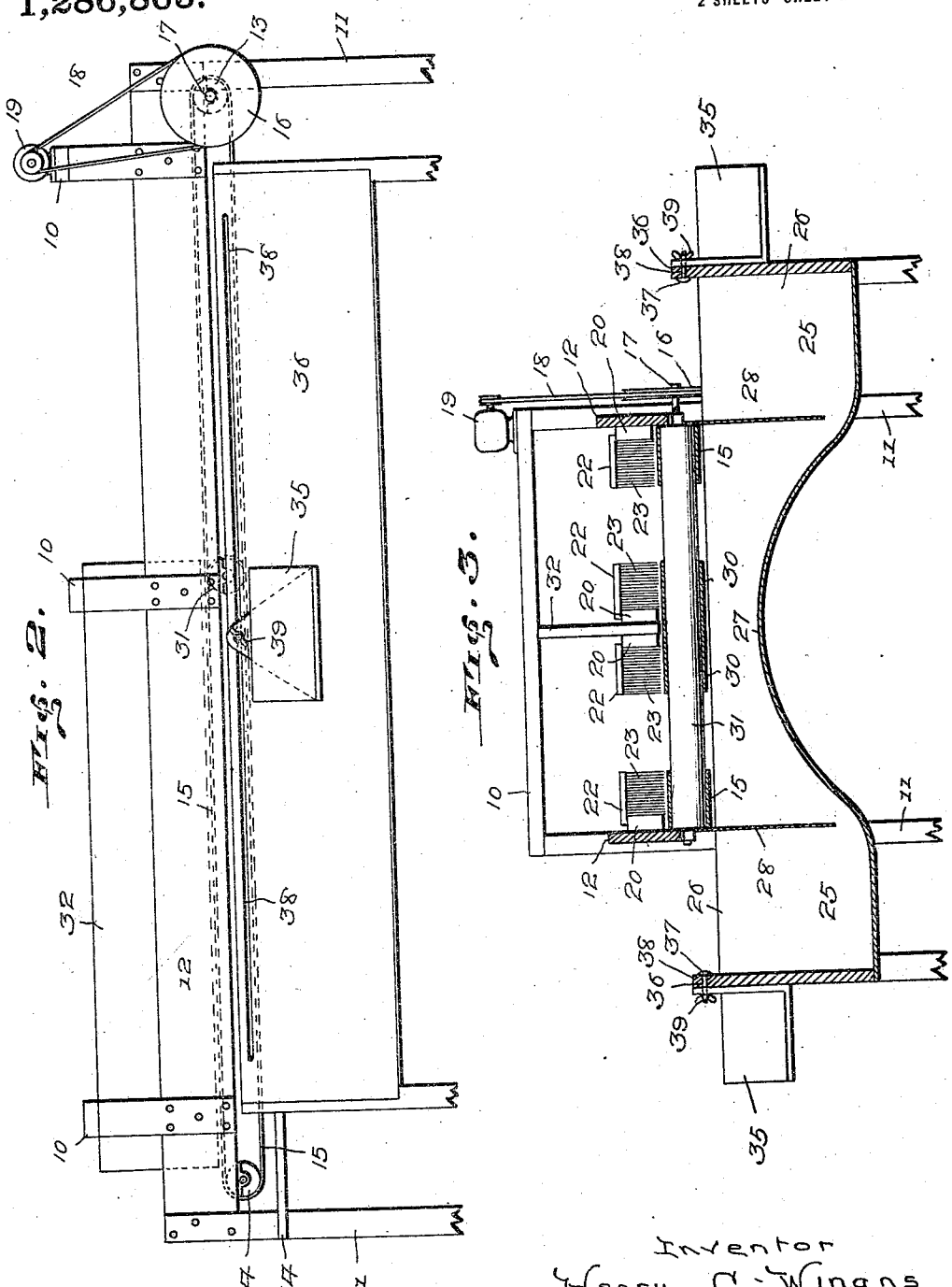

HENRY C. WINANS, OF PRESCOTT, WASHINGTON.

FRUIT-GRADER.

1,286,863.  Specification of Letters Patent.  Patented Dec. 3, 1918.

Application filed July 31, 1918. Serial No. 247,596.

*To all whom it may concern:*

Be it known that I, HENRY C. WINANS, a citizen of the United States, residing at Prescott, in the county of Walla Walla and State of Washington, have invented certain new and useful Improvements in Fruit-Graders; and I do hereby declare the following to be a full, clear, and exact description of the invention, such as will enable others skilled in the art to which it appertains to make and use the same.

This invention relates to a fruit grader and particularly to a mechanism adapted to separate different grades of fruit and also the different sizes of each grade.

The invention has for an object to provide a framework having mounted thereon a plurality of traveling belts, coöperating with which are a series of contact plates extending for different distances over said belts and adapted to discharge therefrom into a series of delivery bins.

A further object of the invention is to provide a conveyer belt with a series of fixed contact plates extending transversely thereof for successively greater distances and each provided with a brush extending laterally from the plate to cleanse the fruit and assist in retaining it in contact with the plate.

Another object of the invention is to provide a plurality of conveyer belts disposed above a receiving hopper which is inclined downwardly from the belts and divided into a series of delivery bins, together with depending curtains adapted to engage and break the fall of the fruit in its passage from the belts to the bins.

Other and further objects and advantages of the invention will be hereinafter set forth and the novel features thereof defined by the appended claims.

In the drawings,

Figure 1 is a top plan of the grader.

Fig. 2, a side elevation thereof.

Fig. 3, a vertical section on line 3—3 of Fig. 1, and

Fig. 4, a detail perspective of one of the contact plates and brushes.

Like numerals of reference designate like parts in the several figures of the drawings.

The numeral 10 indicates the frame of the machine which may be of any desired character or configuration, preferably supported by means of standards 11. The side walls 12 of this frame are provided at opposite ends with bearing rollers 13 and 14 over which the traveling belts 15 are disposed and adapted to be driven by any desired means, for instance, a pulley 16 upon the shaft 17 of the roller 13 connected by a belt 18 with the motor 19 mounted upon the frame. The belts 15 are similar in character and are disposed at the outer sides of the body of the machine adjacent the side walls 12 thereof.

Upon these walls the contact plates 20 are mounted in any desired manner and such plates are of successively greater length in the advancing travel of the belts. These plates may be of any preferred construction and preferably formed with the angular securing base 21 mounted on the wall 12 and the laterally extending arm 22 at their free ends carrying the depending wiper brushes 23, as shown in Fig. 4. These brushes contact with the fruit to remove dust, spray deposits or other objectionable matter from the fruit as it is carried forward by the belt and also act to hold the fruit in contact with the plate 20 for a limited period, so as to secure a positive grading action.

Beneath the belts a series of delivery bins 25 are disposed and extend to opposite sides of the machine. These bins are separated by partitions 26 and the central portion thereof beneath the conveyer belts is raised, as shown at 27, to form a gradual incline down which the fruit will pass to the outer ends of the bins. The base of this inclined portion may be formed of any desired material, such as canvas properly supported in position. For the purpose of breaking the fall of the fruit and preventing injury thereto a series of curtains 28 are provided and depend so as to contact with the fruit in its passage from the belt to said bins.

Intermediate of the conveyer belts 15 is the parallel belt 30 of similar character and extending over the driven roller 14 and an intermediate roller 31 by which motion is transmitted thereto. This belt is disposed beneath a partition wall 32 which carries a series of contact plates and brushes 33 of successively greater length as described in connection with the plates and brushes 20. By this arrangement, certain grades of fruit may be fed to the belts 15 and separated by the contact plates coöperating therewith into different sizes, while another grade may be fed to the belt 30 and correspondingly separated so that a large number of different grades and sizes of fruit may be separated.

The frame 10 is provided at opposite sides at the feed end with suitable supports 34 adapted to receive containers from which the fruit to be graded will be fed by the operator. A further support 35 is adjustably mounted upon the outer wall 36 of the bins 25 so that a packing receptacle may be supported in position to receive the contents of any desired bin and the packing thus conveniently effected. One means for supporting the member 35 comprises a belt 37 disposed to travel in the longitudinal slot 38 in the wall 36 of the bins and adapted to be clamped in the desired position by the nut 39.

In the operation of the invention, the fruit may be fed by one or more operators so that a certain grade is placed upon each of the belts and in the movement of this belt, the fruit is brought into contact with the plate which owing to its increasing length deposits the different sizes thereof into the respective bins. The brushes carried by these contact plates act to temporarily retain the fruit in contact and also thoroughly wipe and cleanse the fruit from any adhering foreign matter. In the illustration shown, the larger size fruit will first fall from the edge of the belt and the smaller sizes be carried forward therewith and successively delivered to the bins. The invention also provides means for safely conveying the fruit from the belt to the bin without injury thereto and for adjustably supporting a packing container adjacent to the bins.

While the details of construction and configuration of the parts have been described and shown in the drawings, still the invention is not confined thereto as changes may be made therein without departing from the spirit of the invention as defined by the following claims.

Having thus described my invention, what I claim as new is:—

1. In a fruit grader, a frame, a conveyer belt, a series of fixed contact plates of successively increasing length extending laterally over said belt, and delivery bins disposed to coöperate with the discharge from said plates.

2. In a fruit grader, a frame, a conveyer belt, a series of fixed contact plates extending for different distances over said belt, delivery bins disposed to coöperate with the discharge from said plates, and brushes carried by said plates at an angle thereto and disposed above said belt.

3. In a fruit grader, a frame, a conveyer belt, a series of fixed contact plates extending for different distances over said belt, delivery bins disposed to coöperate with the discharge from said plates, and depending curtains disposed between the discharge from said belt and said bins.

4. In a fruit grader, a frame, a traveling belt, a series of fixed contact means extending for successively greater distances over said belt, means at the free ends of said contact means for retarding forward movement of material upon the belt, and a series of bins disposed to receive the delivery from said contact means.

5. In a fruit grader, a frame, a plurality of traveling belts disposed adjacent the side walls thereof, a series of contact plates secured to said walls and extending for successively greater distances over said belts, a traveling belt disposed intermediate the first mentioned belts and extending for a portion of the length thereof, a supporting wall, contact plates secured to said wall and extending for successively greater distances over said last mentioned belt, and a series of bins disposed beneath the several belts to receive the discharge from the contact plates coöperating therewith.

6. In a fruit grader, a frame, a conveyer belt mounted thereon, a contact plate disposed above said belt and comprising an angle arm having a securing member, and a transverse arm extending from said plate and provided with a depending brush therefrom.

7. In a fruit grader, a frame, a conveyer belt mounted thereon, a series of fixed contact plates extending obliquely across said belt and each of successively greater length, and means to collect the separated material delivered by said plates.

8. In a fruit grader, a frame, a conveyer belt mounted thereon, a series of fixed contact plates extending obliquely across said belt and each of successively greater length, an arm extending at an angle from said plate and transversely of said belt, a brush depending from said arm above said belt, and a series of bins disposed relative to the delivery from said plates.

In testimony whereof I have signed my name to this specification in the presence of two subscribing witnesses.

HENRY C. WINANS.

Witnesses:
F. J. FLEISCHER,
LAURA McMILLAN.

Copies of this patent may be obtained for five cents each, by addressing the "Commissioner of Patents, Washington, D. C."